(12) United States Patent
Hiroe

(10) Patent No.: US 10,828,971 B2
(45) Date of Patent: Nov. 10, 2020

(54) SEALING MEMBER AND ATTACHMENT STRUCTURE THEREOF

(71) Applicant: TOKAI KOGYO CO., LTD., Obu (JP)

(72) Inventor: Keiji Hiroe, Obu (JP)

(73) Assignee: TOKAI KOGYO CO., LTD., Obu (JP)

( * ) Notice: Subject to any disclaimer, the term of this patent is extended or adjusted under 35 U.S.C. 154(b) by 212 days.

(21) Appl. No.: 16/063,827

(22) PCT Filed: Sep. 1, 2016

(86) PCT No.: PCT/JP2016/075645
§ 371 (c)(1),
(2) Date: Jun. 19, 2018

(87) PCT Pub. No.: WO2017/110148
PCT Pub. Date: Jun. 29, 2017

(65) Prior Publication Data
US 2019/0263238 A1    Aug. 29, 2019

(30) Foreign Application Priority Data
Dec. 22, 2015 (JP) ................................ 2015-249188

(51) Int. Cl.
*B60J 10/21* (2016.01)
*B60J 10/22* (2016.01)
(Continued)

(52) U.S. Cl.
CPC .............. *B60J 10/21* (2016.02); *B60J 10/22* (2016.02); *B60J 10/84* (2016.02); *B60R 13/02* (2013.01); *B60R 13/06* (2013.01)

(58) Field of Classification Search
CPC ... B60J 10/20; B60J 10/21; B60J 10/22; B60J 10/233; B60J 10/235; B60J 10/24;
(Continued)

(56) References Cited

U.S. PATENT DOCUMENTS 4,067,146 A * 1/1978 Mesnel ..................... B60J 10/22
49/490.1
4,461,507 A * 7/1984 Minami ..................... B60J 10/24
296/76

(Continued)

FOREIGN PATENT DOCUMENTS

DE 102008010547 B3 * 8/2009
EP    1072380 A2    1/2001
(Continued)

OTHER PUBLICATIONS

Nov. 22, 2016 International Search Report issued in International Patent Application No. PCT/JP2016/075645.
(Continued)

*Primary Examiner* — Hilary L Gutman
(74) *Attorney, Agent, or Firm* — Oliff PLC

(57) ABSTRACT

A sealing member includes an attachment portion and a sealing portion in a cross-section, the attachment portion being attached to a flange portion provided to an opening edge of a vehicle body opening portion, and the sealing portion being integrated with the attachment portion. The sealing member is formed to be elongated and includes a first portion, a second portion, and a third portion in a longitudinal direction thereof, the first portion having a first cross-sectional shape, the second portion having a second cross-sectional shape, and the third portion continuously and integrally connecting the first portion and the second portion to each other. The cross-sectional shape of the sealing portion having the second cross-sectional shape is smaller than the cross-sectional shape of the sealing portion having the first cross-sectional shape, and the third portion is formed such that a cross-sectional shape thereof changes along the longitudinal direction.

10 Claims, 9 Drawing Sheets

(51) Int. Cl.
*B60J 10/84* (2016.01)
*B60R 13/02* (2006.01)
*B60R 13/06* (2006.01)

(58) Field of Classification Search
CPC ... B60J 10/27; B60J 10/32; B60J 10/40; B60J 10/80; B60J 10/84
USPC .............................................. 49/498.1, 479.1
See application file for complete search history.

(56) References Cited

U.S. PATENT DOCUMENTS

| | | | | |
|---|---|---|---|---|
| 4,531,326 | A * | 7/1985 | Ballocca | B60J 10/22 49/490.1 |
| 4,976,069 | A * | 12/1990 | Arima | B60J 10/22 49/479.1 |
| 5,067,280 | A | 11/1991 | Arima | |
| 5,183,522 | A | 2/1993 | Arima | |
| 5,240,664 | A * | 8/1993 | Hayashi | B29C 53/083 264/167 |
| 5,819,472 | A | 10/1998 | Frost | |
| 6,405,489 | B1 * | 6/2002 | Miura | B60J 10/24 49/475.1 |
| 9,738,146 | B2 * | 8/2017 | Daio | B60J 10/32 |
| 10,611,225 | B2 * | 4/2020 | Hiroe | B60J 10/84 |
| 2005/0064135 | A1 * | 3/2005 | Perrin | B60J 10/24 428/122 |
| 2010/0192470 | A1 * | 8/2010 | Hamada | B60J 10/80 49/493.1 |
| 2017/0368923 | A1 * | 12/2017 | Kuwabara | B60J 10/84 |
| 2018/0370343 | A1 * | 12/2018 | Hiroe | B29C 48/15 |
| 2019/0084209 | A1 * | 3/2019 | Hiroe | B60J 10/84 |

FOREIGN PATENT DOCUMENTS

| | | | |
|---|---|---|---|
| JP | S56-76542 | * | 6/1981 |
| JP | H01-154948 U | | 10/1989 |
| JP | H03-1857 | * | 1/1991 |
| JP | H03-164327 A | | 7/1991 |
| JP | 05031784 A | * | 2/1993 |
| JP | H10-006776 A | | 1/1998 |
| JP | H10-203266 A | | 8/1998 |
| JP | 11179782 A | * | 7/1999 |

OTHER PUBLICATIONS

Nov. 22, 2016 Written Opinion issued in International Patent Application No. PCT/JP2016/075645.
Aug. 18, 2020 Office Action issued in Indian Patent Application No. 201827022938.

* cited by examiner (A)

(B)

(A)

(B)

(A)

(B)

SEALING MEMBER AND ATTACHMENT STRUCTURE THEREOF

TECHNICAL FIELD

The present invention relates to a sealing member and an attachment structure thereof, and particularly relates to a weather strip as a sealing member that is attached to an opening edge of a vehicle body opening portion of a vehicle and an attachment structure thereof.

BACKGROUND ART

Generally, in a vehicle such as an automobile, a weather strip as a sealing member is provided in order to seal a gap between an opening edge of a vehicle body opening portion (for example, a side door opening portion, a back door opening portion, a trunk opening portion, and the like) and a peripheral portion of a door body (for example, a side door, a back door, a trunk lid, and the like) that can close the vehicle body opening portion. However, regarding the weather strip, in the related art, various problems to be solved are pointed out in order to improve practicability.

For example, Patent Document 1 discloses a method and a structure of reinforcing a curved section of a hollow weather strip. In Patent Document 1, a cross-section of the weather strip is stabilized and reinforced by inserting a flexible star plug (10) separate from the weather strip into a desired hollow portion (24) of the weather strip (refer to paragraphs [0001] and [0013] to [0015] and FIG. 4 of Patent Document 1). That is, even in a case where the weather strip is attached to the opening edge of the vehicle body opening portion while curving the weather strip, unnatural deformation of the sealing portion (for example, corrugation or falling of the sealing portion) caused by the curving can be prevented.

CITATION LIST

Patent Document

[Patent Document 1]: JP-A-H10-203266

SUMMARY OF INVENTION

Technical Problem

However, in the technology of Patent Document 1, since the separate body (that is, the star plug) is inserted into the desired hollow portion of the weather strip, inconvenience such as deviation or variation in sealing performance may occur. Specifically, a problem that there is a large difference in sealing performance between the sealing portion where the separate body is present and the sealing portion where the separate body is not present is frequently observed. In addition, in general, although the sealing portion into which the separate body is inserted has high sealing performance, a resistance during the closing of an opening/closing door also tends to increase, and there is inconvenience that it is difficult to close the door (deterioration of door closing performance).

An object of the present invention is to provide a sealing member for a vehicle (in particular, a weather strip capable of being attached to an opening edge of a vehicle body opening portion of a vehicle) in which high door closing performance is realized while securing sealing performance.

Means for Solving the Problems

According to a first aspect, there is provided a sealing member that is configured to be attached to a vehicle body opening portion of a vehicle and is configured to seal a gap between the vehicle body opening portion and a door body capable of closing the vehicle body opening portion, wherein the sealing member is formed to include an attachment portion and a sealing portion in a cross-section, the attachment portion being attached to a flange portion provided to an opening edge of the vehicle body opening portion, and the sealing portion being integrated with the attachment portion, wherein the sealing member is formed to be elongated and includes a first portion, a second portion, and a third portion in a longitudinal direction thereof, the first portion having a first cross-sectional shape, the second portion having a second cross-sectional shape, and the third portion being provided between the first portion and the second portion to continuously and integrally connect the first portion and the second portion to each other, wherein the cross-sectional shape of the sealing portion having the second cross-sectional shape is smaller than the cross-sectional shape of the sealing portion having the first cross-sectional shape, and wherein the third portion is formed such that a cross-sectional shape thereof changes along the longitudinal direction.

According to the first aspect, the sealing member is configured as an elongated sealing member including the first portion having the first cross-sectional shape, the second portion having the second cross-sectional shape, and the third portion having the changing cross-sectional shape. Therefore, sealing performance suitable for each attachment portion can be imparted to the sealing member. In addition, according to the invention, unlike the example of the related art, a separate body for insertion is not necessary. Accordingly, high door closing performance can be realized while securing sealing performance.

According to a second aspect, the elongated sealing member includes the third portion at at least two positions.

According to the second aspect, the following effects can be obtained in addition to the effects of the above configuration. That is, by providing the third portion having the changing cross-sectional shape at at least two positions in the elongated sealing member, the first and second portions can be easily set at desired positions in the sealing member.

According to a third aspect, a length of the third portion is longer than a length of the first portion and is longer than a length of the second portion.

According to the third aspect, the following effects can be obtained in addition to the effects of the above configurations. That is, the third portion having the changing cross-sectional shape is longer than the other portions (the first and second portions), and the proportion of the third portion in the entire length of the sealing member is relatively high. Therefore, when the door body is closed, a rapid change in load hardly occurs (a change in load is gentle), and door closing performance can be improved.

According to a fourth aspect, the opening edge of the vehicle body opening portion is bordered with a plurality of side portions and a plurality of corner portions which are continuous to the side portions, and the first portion has the same length as at least one corner portion of the opening edge of the vehicle body opening portion.

According to the fourth aspect, the following effects can be obtained in addition to the effects of the above configurations. That is, the corner portion of the vehicle body opening portion over the entire length can be sealed with the first portion having the highest rigidity and having the highest deformation resistance in the elongated sealing member.

According to a fifth aspect, the opening edge of the vehicle body opening portion is bordered with a plurality of side portions and a plurality of corner portions which are continuous to the side portions, and the second portion has the same length as at least one side portion of the opening edge of the vehicle body opening portion.

According to the fifth aspect, the following effects can be obtained in addition to the effects of the above configurations. That is, by applying the second portion having the smallest cross-sectional shape in the elongated sealing member to the side portion of the vehicle body opening portion, the total weight of the sealing member can be reduced, and door closing performance can be improved.

According to a sixth aspect, the opening edge of the vehicle body opening portion is bordered with a plurality of side portions and a plurality of corner portions which are continuous to the side portions, and the third portion has the same length as or has a larger length than at least one side portion of the opening edge of the vehicle body opening portion.

According to the sixth aspect, the following effects can be obtained in addition to the effects of the above configurations. That is, by applying the third portion having the changing cross-sectional shape to the side portion of the vehicle body opening portion, a load during the closing of the door body can be made to gradually change over the entire length of the side portion. As a result, door closing performance can be improved.

According to a seventh aspect, the third portion corresponds to a side portion that extends in a direction from a hinge-side base end of the door body in a closed state toward a hinge opposite-side distal end of the door body in the closed state among the plurality of side portions configuring the opening edge of the vehicle body opening portion.

According to the seventh aspect, the following effects can be obtained in addition to the effects of the above configuration. That is, by applying the third portion having the changing cross-sectional shape to the side portion that extends in the direction from the hinge-side base end of the door body in the closed state toward the hinge opposite-side distal end of the door body in the closed state, the load during the closing of a hinge-type door body can be made to gradually change over the entire length of the side portion of the door body. As a result, door closing performance can be improved.

According to an eighth aspect, the third portion has the first cross-sectional shape at an end position close to the hinge-side base end of the door body and has the second cross-sectional shape at an end position close to the hinge opposite-side distal end of the door body.

According to the eighth aspect, the following effects can be obtained in addition to the effects of the above configuration. That is, according to this configuration, the cross-sectional shape of the third portion corresponding to the side portion, which extends in the direction from the hinge-side base end of the door body in the closed state toward the hinge opposite-side distal end of the door body in the closed state, gradually decreases in size from the hinge-side base end of the door body toward the hinge opposite-side distal end of the door body. Thus, air is likely to escape during the closing of the hinge type door body, and the door body can be closed with a relatively small force.

According to a ninth aspect, a height of the sealing portion of at least a part of the second portion is lower than a height of the sealing portion of the first portion.

According to the ninth aspect, the following effects can be obtained in addition to the effects of the above configurations. That is, by making the height of the sealing portion of the first portion and the height of the sealing portion of the second portion to be different from each other, each of the first and second portions can be made to have a cross-sectional shape suitable for a position to which the sealing member is attached (depending on whether the position is the side portion or the corner portion of the vehicle body opening portion).

According to a tenth aspect, a wall thickness of the sealing portion of at least a part of the second portion is smaller than a wall thickness of the sealing portion of the first portion.

According to the tenth aspect, the following effects can be obtained in addition to the effects of the above configurations. That is, by making the wall thickness of the sealing portion of the first portion and the wall thickness of the sealing portion of the second portion to be different from each other, each of the first and second portions can be made to have a cross-sectional shape suitable for a position to which the sealing member is attached (depending on whether the position is the side portion or the corner portion of the vehicle body opening portion).

According to an eleventh aspect, a cross-sectional shape of the attachment portion of the first portion, a cross-sectional shape of the attachment portion of the second portion, and a cross-sectional shape of the attachment portion of the third portion are substantially the same.

According to the eleventh aspect, the following effects can be obtained in addition to the above effects of the configurations. That is, according to this configuration, the cross-sectional shape of the attachment portion is made to be substantially the same (substantially uniform) over the entire length of the sealing member. Therefore, the sealing member can be stably attached over the entire region of the opening edge of the vehicle body opening portion.

Advantageous Effects of the Invention

According to the present invention, high door closing performance can be realized while securing sealing performance.

DESCRIPTION OF EMBODIMENTS

Hereinafter, some embodiments of the present invention will be described with reference to the drawings.

First Embodiment

FIGS. 1 to 4 illustrate a first embodiment of the invention.

Figure 1:
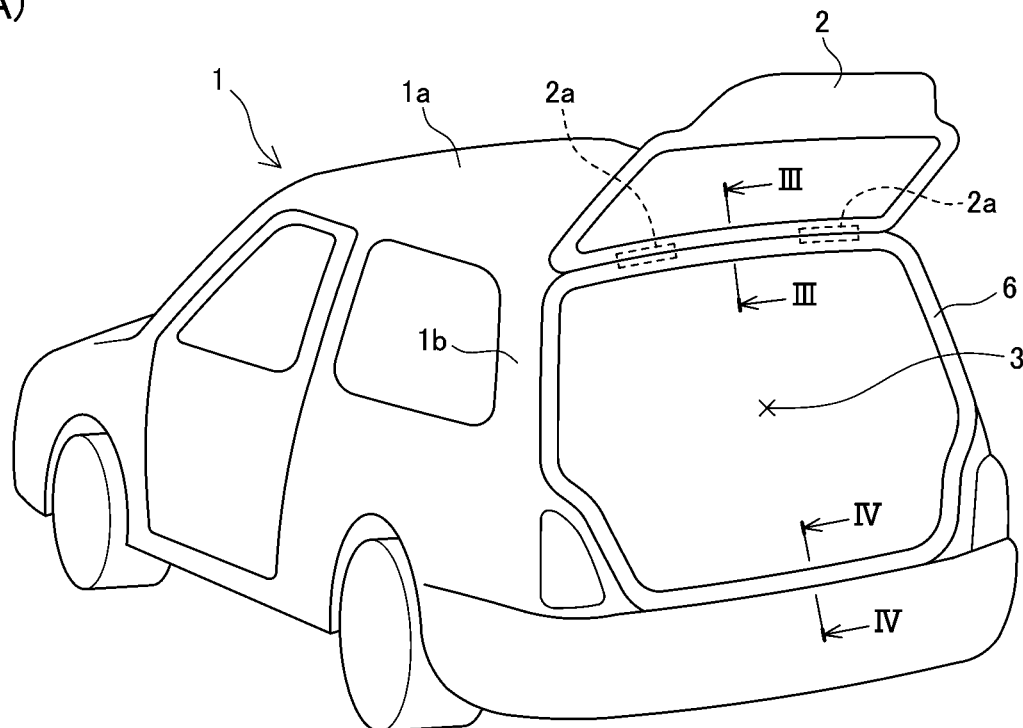
FIG. 1 is a schematic view of a back door opening portion of an automobile, wherein (A) is a perspective view illustrating a state where a weather strip according to a first embodiment is mounted and (B) is a perspective view illustrating a state where the weather strip is not mounted.
Figure 1:
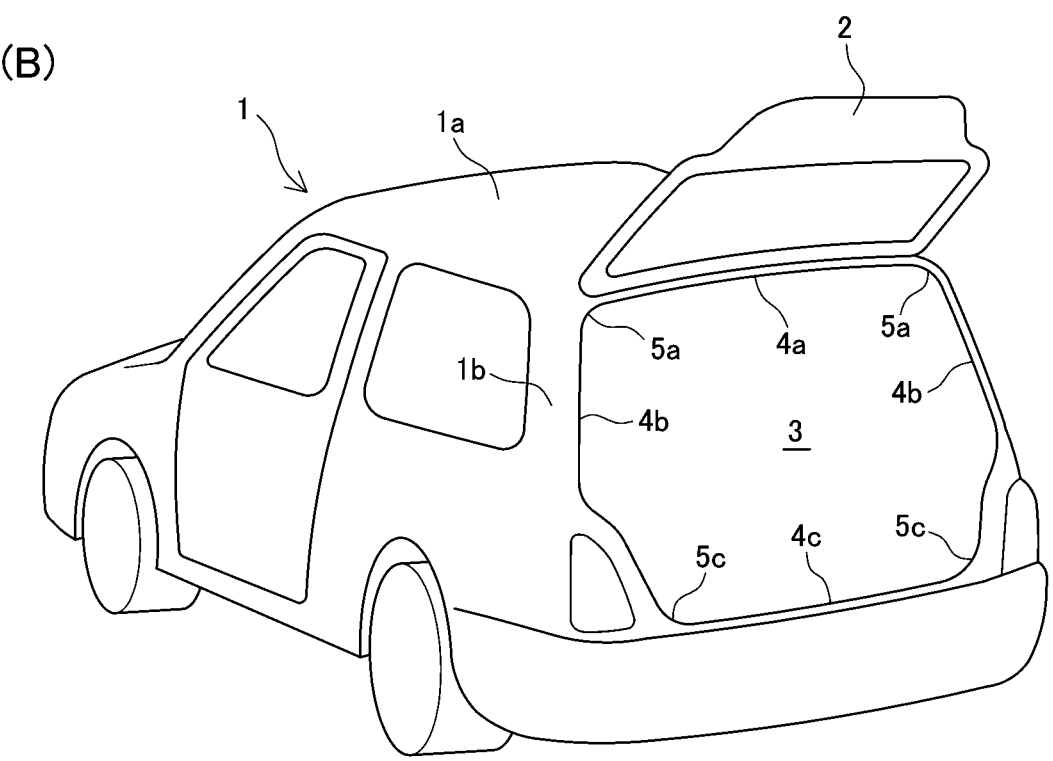

(A) and (B) of FIG. 1 illustrate a back door opening portion 3 of a general two-box automobile 1 in a state where a back door 2 is flipped up. The reference numeral "1a" represents a roof of the vehicle, the reference numeral "1b" represents a pillar portion of a vehicle rear portion, and the back door 2 is supported by hinges 2a (indicated by broken lines) to be openable and closable in the vicinity of a rear end portion of a roof 1a.

As illustrated in (B) of FIG. 1, an opening edge of the back door opening portion 3 is bordered with a combination of four side portions (4a, 4b, 4c) and four corner portions (5a, 5c). The four side portions include: a roof-side side portion 4a that extends substantially horizontally along an upper edge of the back door opening portion 3; a pair of left and right pillar-side side portions 4b that extends along the pillar portion 1b in an up-down direction; and a floor-side side portion 4c that extends substantially horizontally along a lower edge of the back door opening portion 3. The four corner portions include: a pair of left and right roof-side corner portions 5a that are positioned between the roof-side side portion 4a and the pillar-side side portion 4b; and a pair of left and right floor-side corner portion 5c that are positioned between the floor-side side portion 4c and the pillar-side side portion 4b. Each of the corner portions 5a and 5c is a portion that is curved to smoothly connect adjacent two side portions to each other, and thus will also be called "curved portion".

Figure 2:
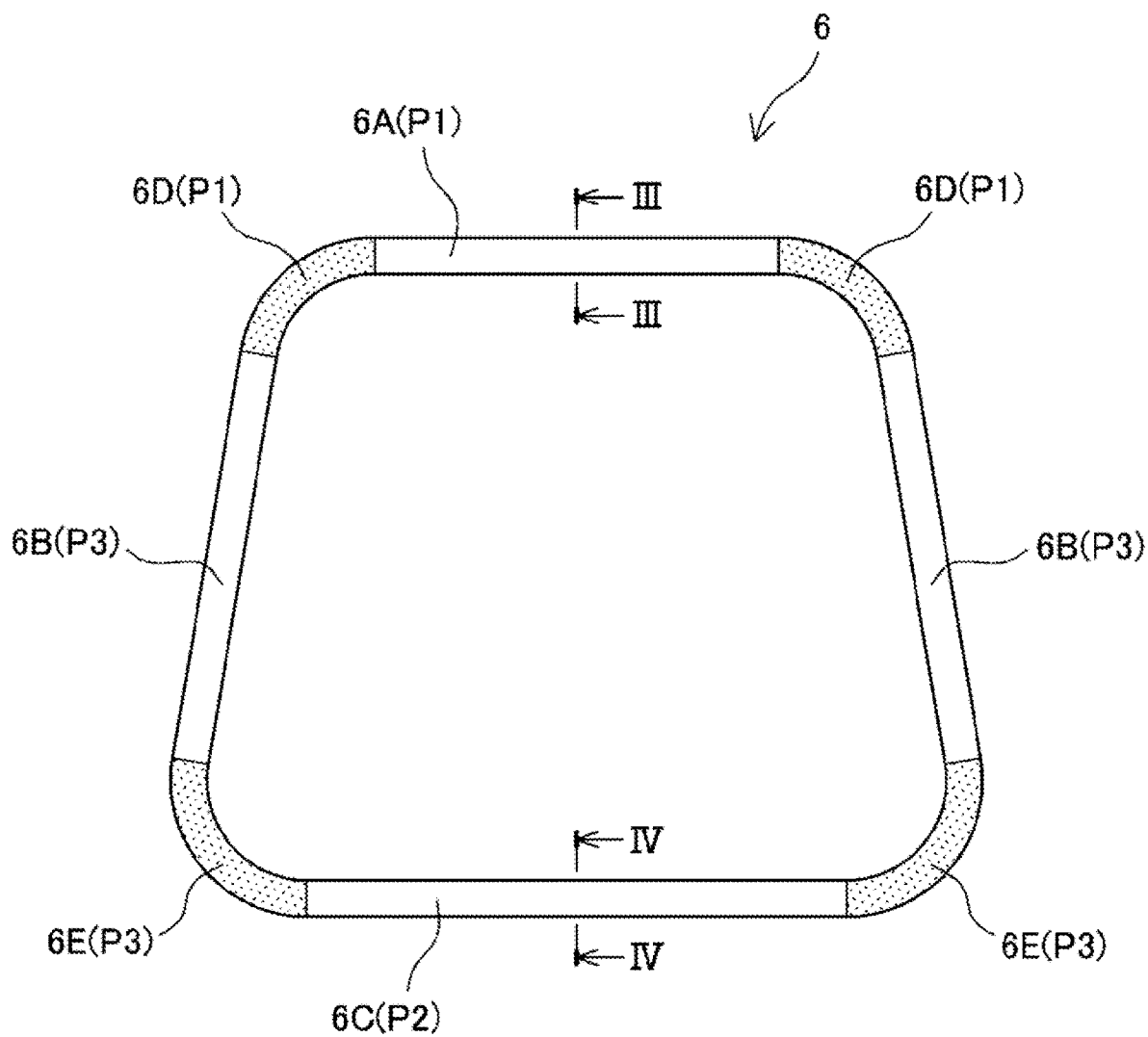
FIG. 2 is a schematic view illustrating the weather strip according to the first embodiment.

(A) of FIG. 1 illustrates a state where a weather strip 6 is mounted on the opening edge of the back door opening portion 3. The weather strip 6 according to the first embodiment is formed in an annular shape (or an endless strip shape) corresponding to the opening edge of the back door opening portion 3, and is configured as an elongated rubber member having a length corresponding to the entire peripheral length of the opening edge of the back door opening portion 3. FIG. 2 schematically illustrates the weather strip 6 before being mounted on the back door opening portion 3. As illustrated in FIG. 2 and (A) of FIG. 1, the weather strip 6 includes: a roof-side side portion corresponding portion 6A corresponding to the roof-side side portion 4a; two pillar-side side portion corresponding portions 6B corresponding to the two pillar-side side portions 4b; a floor-side side portion corresponding portion 6C corresponding to the floor-side side portion 4c; two roof-side corner portion corresponding portions 6D corresponding to the two roof-side corner portions 5a; and two floor-side corner portion corresponding portions 6E corresponding to the two floor-side corner portions 5c. In (B) of FIG. 1 and FIG. 2, the opening edge of the back door opening portion 3 and the weather strip 6 are schematically illustrated in bilaterally symmetric shapes but are not necessarily bilaterally symmetric. The opening edge of the back door opening portion 3 and the weather strip 6 may have bilaterally asymmetric shapes in which the number of side portions or corner portions is appropriately set according to the entire design of the vehicle.

At any position of the weather strip 6 in a longitudinal direction, basically, cross-sectional shapes are substantially the same (including a similar shape). However, the dimension setting of the cross-sectional shape varies depending on the positions. Specifically, the five corresponding portions 6A to 6E of the weather strip 6 are classified into a first portion P1, a second portion P2, and a third portion P3 depending on characteristics of a dimension setting of a cross-sectional shape.

The first portion P1 is a portion having a uniform cross-sectional shape (referred to as "first cross-sectional shape") at any position along the longitudinal direction, and provides a first uniform cross-sectional shape section in the weather strip 6.

The second portion P2 is a portion having a uniform cross-sectional shape (referred to as "second cross-sectional shape") at any position along the longitudinal direction, and provides a second uniform cross-sectional shape section in the weather strip 6. The second cross-sectional shape is smaller than the first cross-sectional shape.

The third portion P3 is a portion that is provided between the first portion P1 and the second portion P2 and continuously and integrally connects both the portions P1 and P2 to each other, and provides a gradually changing cross-sectional shape section where a cross-sectional shape gradually changes from the first cross-sectional shape to the second cross-sectional shape in the weather strip 6.

In the weather strip 6 according to the first embodiment, as illustrated in FIG. 2, the roof-side side portion corresponding portion 6A and the roof-side corner portion corresponding portions 6D adjacent to the left and right sides thereof are formed as the first portion P1. In addition, the floor-side side portion corresponding portion 6C is formed as the second portion P2. Further, the pillar-side side portion corresponding portion 6B and the floor-side corner portion corresponding portion 6E adjacent to the lower side thereof are formed as the third portion P3. In the embodiment, the length of the third portion P3 (6B+6E) is longer than the length of the first portion P1 (6D+6A+6D) and is longer than the length of the second portion P2 (6C). Accordingly, in a case where the third portion P3 having the changing cross-sectional shape is longer than the other portions (the first portion P1 and the second portion P2) and thus the proportion of the third portion P3 in the entire length of the weather strip 6 is high, a rapid change in load during the closing of the back door 2 is not likely to occur, and door closing performance can be improved. In a case where the lengths of the first portion P1, the second portion P2, and the third portion P3 adjacent to each other are compared to each other, it is preferable that the above-described length relationship (P1<P3, P2<P3) is satisfied.

Figure 3:
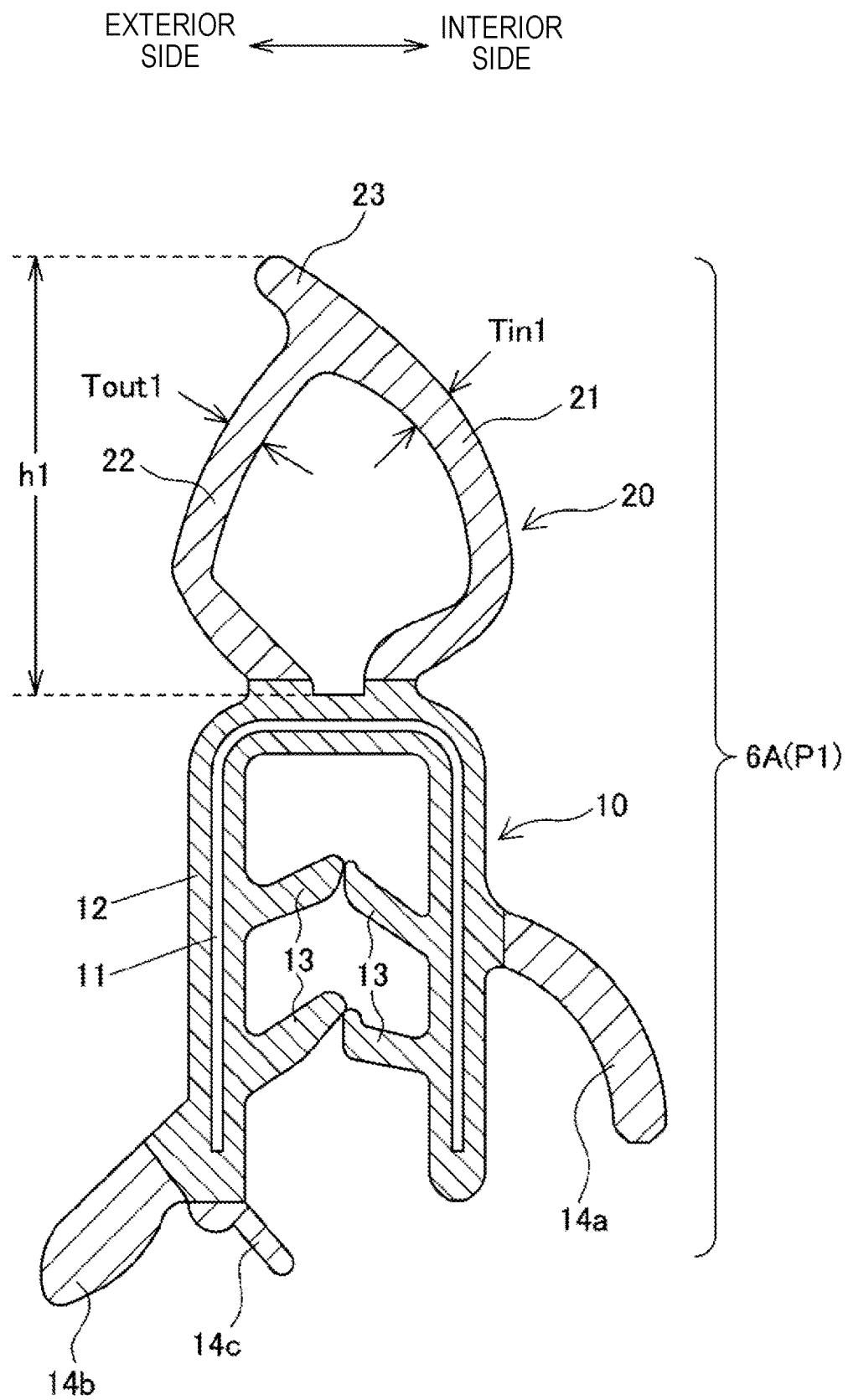
FIG. 3 is a cross-sectional view of the weather strip taken along line in (A) of FIG. 1 and FIG. 2.
Figure 4:
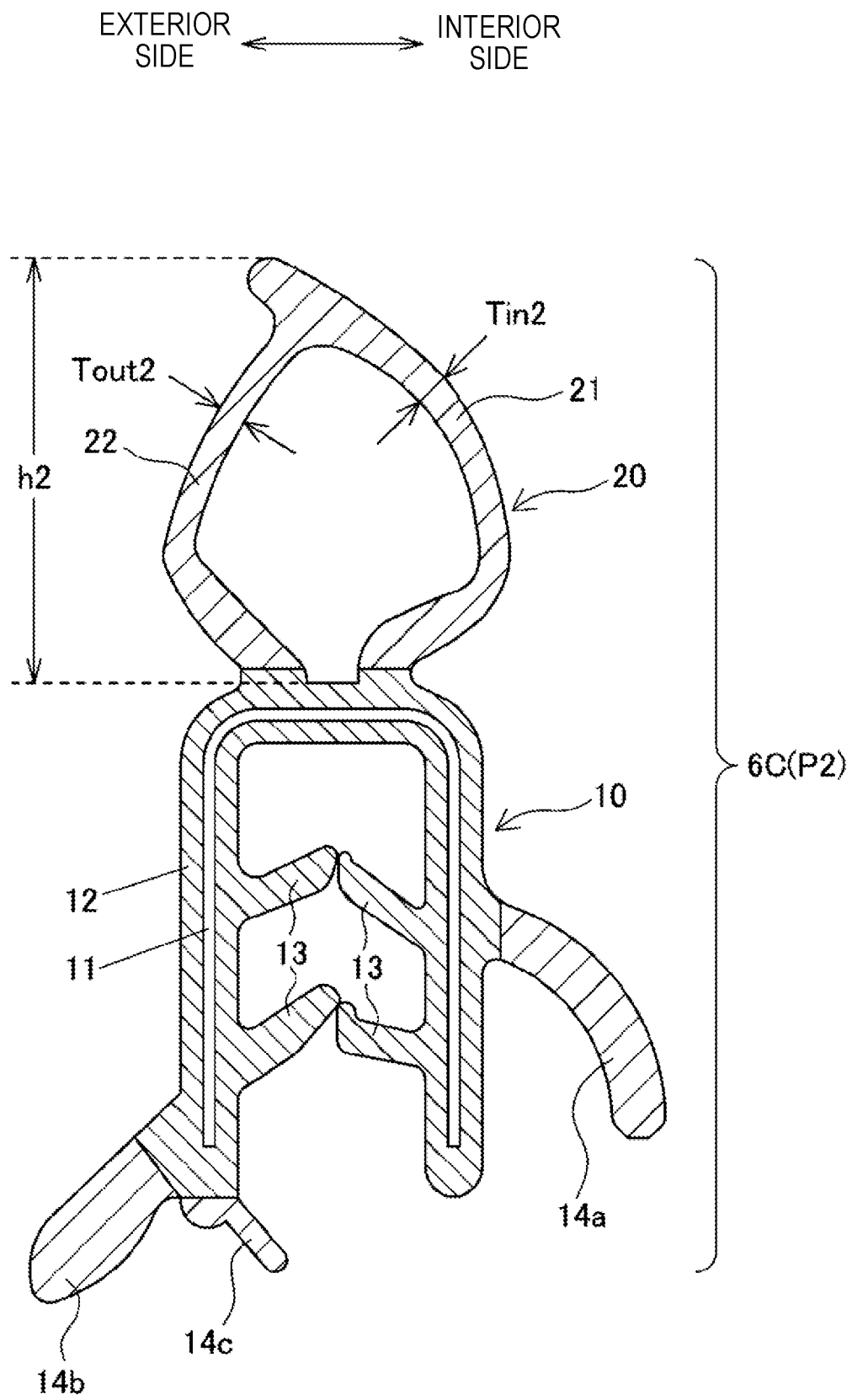
FIG. 4 is a cross-sectional view of the weather strip taken along line IV-IV in (A) of FIG. 1 and FIG. 2.

FIG. 3 illustrates a cross-section taken along line III-III of (A) of FIG. 1 and FIG. 2. FIG. 3 illustrates not only a cross-section of the roof-side side portion corresponding portion 6A but also a cross-section of the first portion P1 according to the first embodiment. FIG. 4 illustrates a cross-section taken along line IV-IV of (A) of FIG. 1 and FIG. 2. FIG. 4 illustrates not only a cross-section of the floor-side side portion corresponding portion 6C but also a cross-section of the second portion P2 according to the first embodiment. A cross-section of the third portion P3 is not illustrated in the drawing and has a similar shape to the cross-sectional shapes of the first portion P1 (FIG. 3) and the second portion P2 (FIG. 4). As can be seen from FIGS. 3 and 4, each of the portions (P1, P2, and P3) of the weather strip 6 according to the first embodiment includes: an attachment portion 10; and a sealing portion 20 with a hollow tunnel shape that is disposed adjacent to the attachment portion 10.

The attachment portion 10 is a portion that is directly attached to the opening edge of the back door opening portion 3 serving as an attached member, and the shape and dimension of a cross-section of the attachment portion 10 are substantially uniform at any position of the weather strip 6 (that is, at any position of P1, P2, and P3). Specifically, as illustrated in FIGS. 3 and 4, the attachment portion 10 includes: a core 11 formed of metal (hereinafter, also referred to as "core metal 11") that is bent in an "inverted U-shape" in cross-section; and a rubber cover portion 12 that is attached to cover the core metal 11. In an inner portion of the rubber cover portion 12, four holding lips 13 that protrude from inner surfaces thereof are provided. A vehicle side member (flange portion) configuring the opening edge of the back door opening portion 3 is interposed between the holding lips 13 such that the weather strip is fixed to the opening edge of the back door opening portion 3. In addition, in an outer end portion of the rubber cover portion 12 and the vicinity of one end portion (in FIG. 3, the vicinity of a left lower end portion) of the attachment portion 10, three auxiliary lips (an interior lip 14$a$, an exterior lip 14$b$, and a distal lip 14$c$) are provided to protrude from outer surfaces thereof. Among the three auxiliary lips, the interior lip 14$a$ is a cover lip for covering an end portion of an interior material such as a carpet or a cloth material. In addition, the exterior lip 14$b$ and the distal lip 14$c$ are lips for sealing gaps between the vehicle body and the attachment portion 10 when the weather strip 6 is mounted on the back door opening portion 3.

Each of the sealing portion 20 of the roof-side side portion corresponding portion 6A (the first portion P1) illustrated in FIG. 3 and the sealing portion 20 of the floor-side side portion corresponding portion 6C (the second portion P2) illustrated in FIG. 4 includes an interior wall portion 21 and an exterior wall portion 22. The sealing portion 20 is surrounded by the wall portions 21 and 22 such that a tunnel-shaped hollow region having a substantially rhombic shape in cross-section is secured in the sealing portion 20.

A cross-sectional shape of the hollow sealing portion 20 is substantially uniform over then entire region of the weather strip 6. However, the dimension setting of a wall portion varies depending on the positions. Specifically, when wall thicknesses of the interior and exterior wall portions 21 and 22 of the roof-side side portion corresponding portion 6A (the first portion P1) are represented by Tin1 and Tout1, and when wall thicknesses of the interior and exterior wall portions 21 and 22 of the floor-side side portion corresponding portion 6C (the second portion P2) are represented by Tin2 and Tout2, the wall thicknesses are set such that Tin2<Tin1 and Tout2<Tout1 are satisfied. It is preferable that Tin1 (or Tout1) is set to be about 1.4 to 2.0 times Tin2 (or Tout2).

Wall thicknesses Tin3 and Tout3 of the interior and exterior wall portions 21 and 22 of the sealing portion 20 of the third portion P3 disposed between the first portion P1 and the second portion P2 are not uniform and are set to be gradually changing (or variable) such that the wall thicknesses gradually decrease from an end portion on the first portion P1 side toward an end portion on the second portion P2 side. The wall thicknesses (Tin3, Tout3) of the sealing portion 20 of the third portion P3 are set such that Tin2<Tin3<Tin1 and Tout2<Tout3<Tout1 are satisfied. Here, a change rate (rate of increase and decrease) of the wall thicknesses (Tin3, Tout3) of the sealing portion 20 of the third portion P3 may be uniform over the entire region in the longitudinal direction, but may change midway through the region.

Further, by reflecting the above-described difference in the wall thickness setting of the sealing portion 20 between P1, P2, and P3, a height h1 (FIG. 3) of the sealing portion 20 of the first portion P1 represented by the roof-side side portion corresponding portion 6A is set to be higher than a height h2 (FIG. 4) of the sealing portion 20 of the second portion P2 represented by the floor-side side portion corresponding portion 6C (h2<h1). The height h3 of the sealing portion 20 of the third portion P3 disposed between the first portion P1 and the second portion P2 is not uniform and is set to be gradually changing (or variable) such that the height gradually decreases from an end portion on the first portion P1 side toward an end portion on the second portion P2 side. Accordingly, the height h3 of the sealing portion 20 of the third portion P3 is set such that h2<h3<h1 is satisfied.

A rubber material which forms the rubber cover portion 12 and the four holding lips 13 in the attachment portion 10 is obtained, for example, by adding carbon black and a vulcanizing agent to EPDM (ethylene propylene diene copolymer). During the manufacturing process, vulcanization (that is, a polymer crosslinking reaction) using the vulcanizing agent is performed. On the other hand, a rubber material which forms the three auxiliary lips 14$a$ to 14$c$ and the sealing portion 20 in the attachment portion 10 is obtained, for example, by adding carbon black, a vulcanizing agent, and a foaming agent to EPDM. During the manufacturing process, vulcanization (that is, a polymer crosslinking reaction) using the vulcanizing agent and foaming (sponging) using the foaming agent are performed. Incidentally, the EPDM sponge rubber material which foams with the foaming agent is softer and has higher flexibility than the EPDM vulcanized rubber material used for forming the rubber cover portion 12 and the like. The weather strip 6 according to the embodiment is manufactured with an extrusion method using the above-described two kinds of rubber materials. Using the extrusion method, an elongated rubber member in which the above-described first to third portions (P1, P2, and P3) are continuously provided can be manufactured.

In the first embodiment, by setting the roof-side corner portion corresponding portion 6D as the first portion P1, the wall thicknesses (Tin1, Tout1) of the sealing portion 20 can be made to be significantly larger than the wall thicknesses (Tin3, Tout3) of the sealing portion 20 of the pillar-side side portion corresponding portion 6B (the third portion P3) adjacent to the roof-side corner portion corresponding portion 6D, and can be made to be the thickest in the weather strip 6. Therefore, the rigidity of the roof-side corner portion corresponding portion 6D (the first portion P1) can be made to be relatively high. As a result, even in a case where the roof-side corner portion corresponding portion 6D is attached to the roof-side corner portion 5$a$ of the back door opening portion 3 while curving the roof-side corner portion corresponding portion 6D, the sealing portion 20 can be prevented from being unnaturally deformed or from being corrugated.

In addition, in the first embodiment, by setting the floor-side corner portion corresponding portion 6E as the third portion P3, the wall thicknesses (Tin3, Tout3) of the sealing portion 20 can be made to be significantly larger than the wall thicknesses (Tin2, Tout2) of the sealing portion 20 of the floor-side side portion corresponding portion 6C (the second portion P2) adjacent to the floor-side corner portion corresponding portion 6E. Therefore, in the floor-side corner portion corresponding portion 6E, as in the case of the roof-side corner portion corresponding portion 6D, the sealing portion 20 can be prevented from being unnaturally deformed during the attachment or from being corrugated.

In a case where the weather strip 6 according to the embodiment is mounted on the back door opening portion 3, for example, the floor-side side portion corresponding portion 6C (the second portion P2) is assembled into the floor-side side portion 4c. Therefore, the sealing portion 20 of the floor-side side portion corresponding portion 6C does not undergo any deformation, and even after the mounting, the height of the sealing portion 20 is substantially maintained at h2 (FIG. 4). On the other hand, for example, the roof-side corner portion corresponding portion 6D (the first portion P1) is assembled into the roof-side corner portion 5a. Therefore, during the mounting, the sealing portion 20 of the roof-side corner portion corresponding portion 6D is unavoidably affected by a curving operation. This effect appears as deformation that makes a rhombic shape in cross-section flat in the height direction. Specifically, in FIG. 3, the deformation of the sealing portion 20 occurs such that an upper end portion 23 of the sealing portion 20 lowers (or sinks) toward the attachment portion 10. As a result, the height of the sealing portion 20 during the mounting is slightly lower than h1 which is the initially set height. It is preferable that the amount of lowering (amount of sinking) Δh of the height of the sealing portion caused by the curving deformation during the mounting is estimated in advance to set the dimension of the initial height h1=(h2+Δh) of the sealing portion 20 of the roof-side corner portion corresponding portion 6D. By setting the dimension in advance as described above, after mounting the weather strip 6 on the back door opening portion 3, the height of the sealing portion 20 corresponding to the floor-side side portion 4c and the height of the sealing portion 20 corresponding to the roof-side corner portion 5a can be made to be substantially the same (that is, h2). This way, the height of the sealing portion after the mounting can be made to be uniform, and sealing characteristics can be made to be substantially uniform over the entire peripheral length of the opening edge of the back door opening portion 3.

According to the first embodiment, the weather strip 6 is configured as an elongated rubber member including the first portion P1 having the first cross-sectional shape (FIG. 3), the second portion P2 having the second cross-sectional shape (FIG. 4), and the third portion P3 having the gradually changing cross-sectional shape. Therefore, sealing performance suitable for an attachment target position of each of the portions (P1 to P3) can be imparted to the weather strip 6. In addition, according to the weather strip 6, unlike the example of the related art, a separate body for insertion is not necessary. Therefore, an increase in compressive load during the closing of the back door 2 is relatively gentle and at least is not rapid. Therefore, an excessive force is not necessary for closing the back door 2.

In the weather strip 6 according to the first embodiment, the pillar-side side portion corresponding portion 6B corresponding to the pillar-side side portion 4b, which extends in a direction from a hinge-side base end of the back door 2 toward a hinge opposite-side distal end of the back door 2 when the back door 2 is closed, is formed as the third portion P3. As described above, the third portion P3 having the gradually changing cross-sectional shape is assembled into the pillar-side side portion 4b that extends in the direction from the hinge-side base end of the back door 2 toward the hinge opposite-side distal end of the back door 2. Thus, the load during the closing of the back door 2 as a hinge-type door body can be made to gradually change over the entire length of a side portion of the back door 2. As a result, door closing performance can be improved. Particularly in the embodiment, the third portion P3 (6B+6E) is continuous to the first portion P1 (that is, 6D) having the first cross-sectional shape (FIG. 3) at an upper end position (an end position close to the hinge-side base end), and is continuous to the second portion P2 (that is, 6C) having the second cross-sectional shape (FIG. 4) at a lower end position (an end position close to the hinge opposite-side distal end) of the third portion P3 (6B+6E). Therefore, the cross-sectional shape of the third portion P3 (6B+6E) gradually decreases in size in a direction from the upper end position (the end position close to the hinge-side base end) toward the lower end position (the end position close to the hinge opposite-side distal end). Thus, air is likely to escape during the closing of the back door 2, and the back door 2 can be closed with a relatively small force.

Another Example of First Embodiment

In the weather strip 6 according to the first embodiment, the roof-side corner portion corresponding portion 6D is formed as the first portion P1. However, the roof-side corner portion corresponding portion 6D may be formed as the third portion P3.

In the weather strip 6 according to the first embodiment, the floor-side corner portion corresponding portion 6E is formed as the third portion P3. However, the floor-side corner portion corresponding portion 6E may be formed as the second portion P2.

Boundary lines between the respective side portions and the respective corner portions in the opening edge of the back door opening portion 3 do not necessarily match with boundary lines of the first to third portions (P1 to P3) of the weather strip 6. For example, the floor-side corner portion corresponding portion 6E can also be formed as a combination of the third portion P3 and the second portion P2.

In addition, the weather strip 6 can also be formed as the third portion P3 over substantially the entire length. That is, the weather strip 6 can also be formed such that the third portions P3 appear to be connected to each other by setting the first portion P1 and the second portion P2 to be extremely short with respect to the third portion P3.

Second and Third Embodiments (Introduction)

Figure 5:
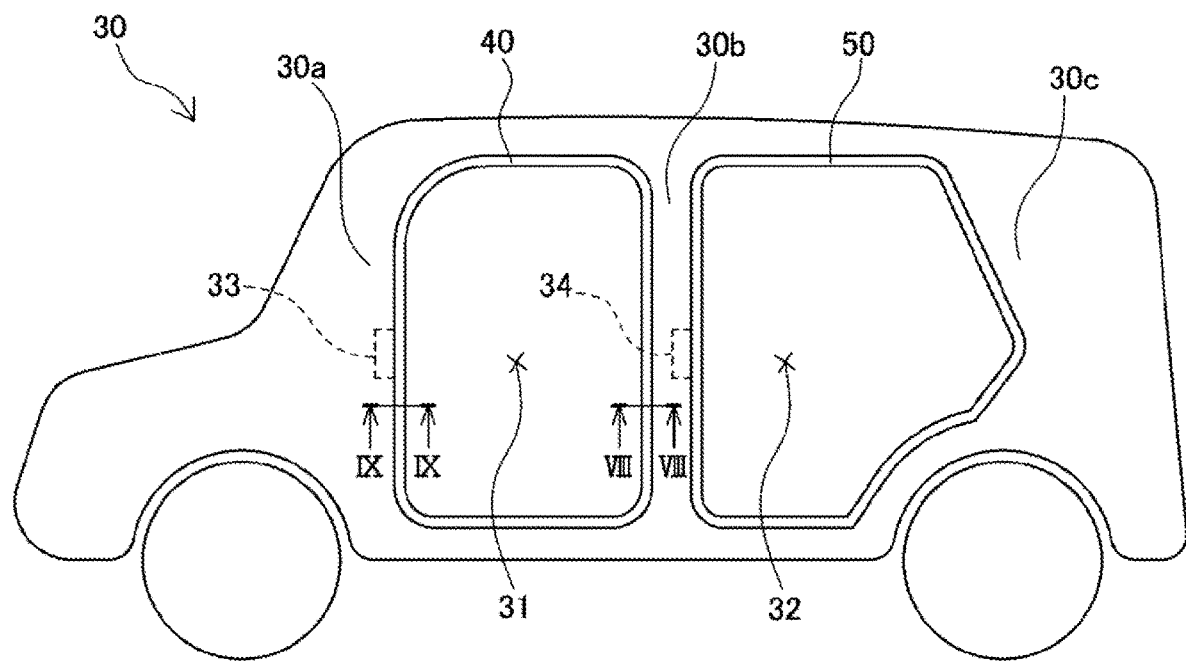
FIG. 5 is a side view illustrating the outline of a side door opening portion of an automobile in a state where weather strips according to second and third embodiments are mounted.
Figure 6:
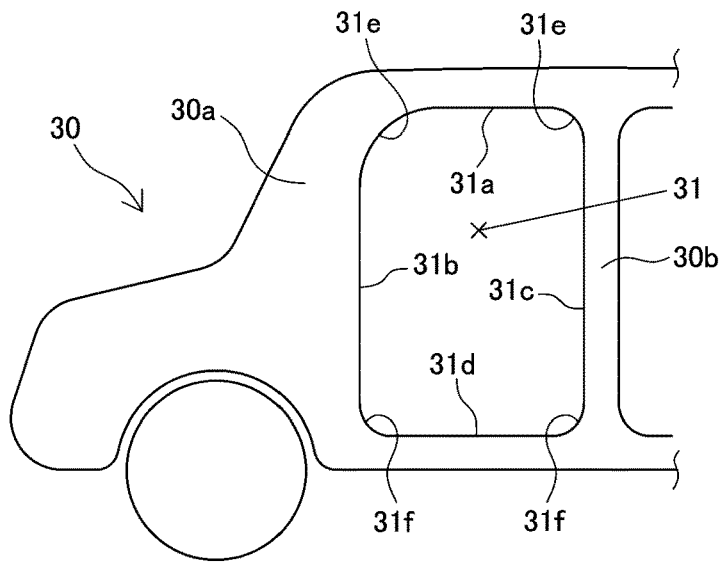
In FIG. 6, (A) is a side view illustrating a front door opening portion in a state where the weather strip is not mounted, and (B) is a schematic view illustrating the weather strip according to the second embodiment.
Figure 6:
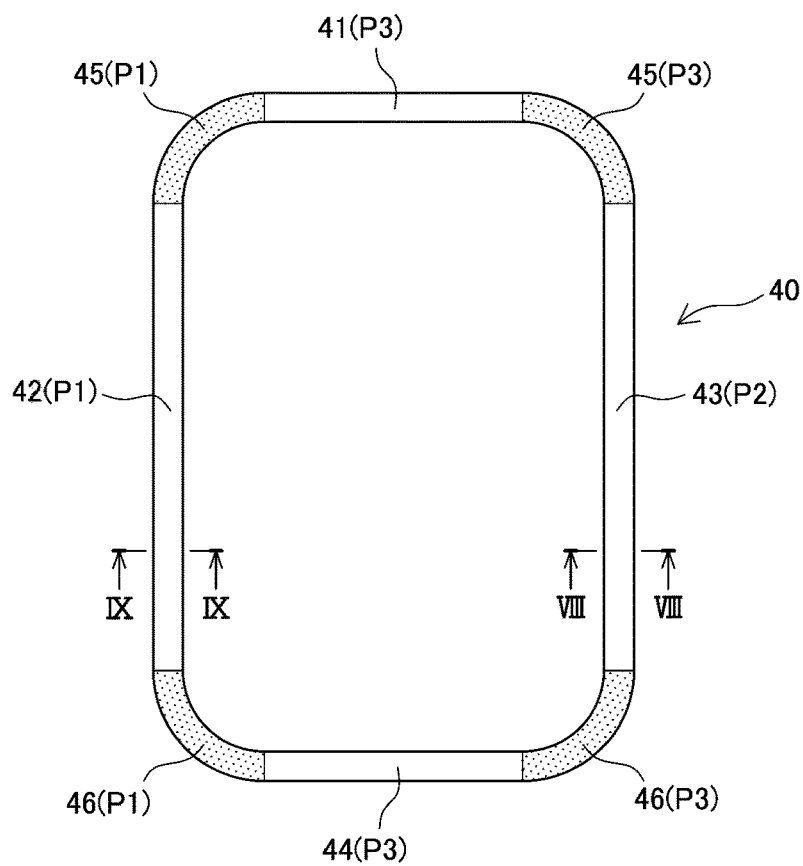
Figure 7:
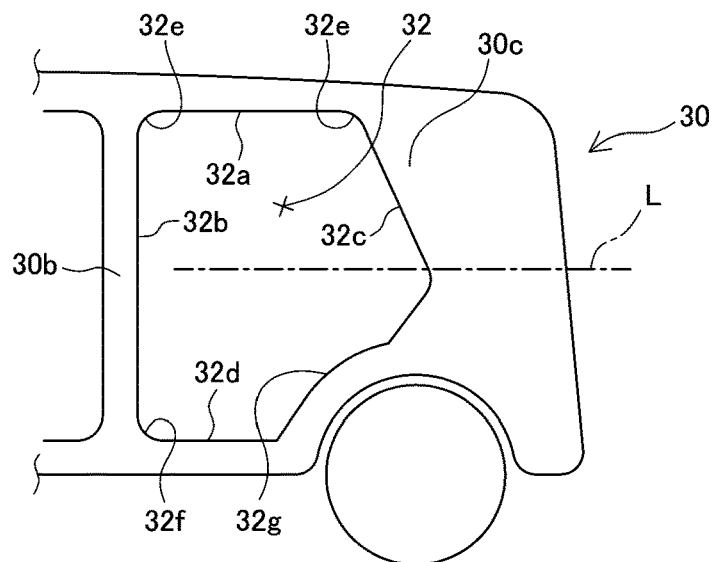
In FIG. 7, (A) is a side view illustrating a rear door opening portion in a state where the weather strip is not mounted, and (B) is a schematic view illustrating the weather strip according to the third embodiment.
Figure 7:
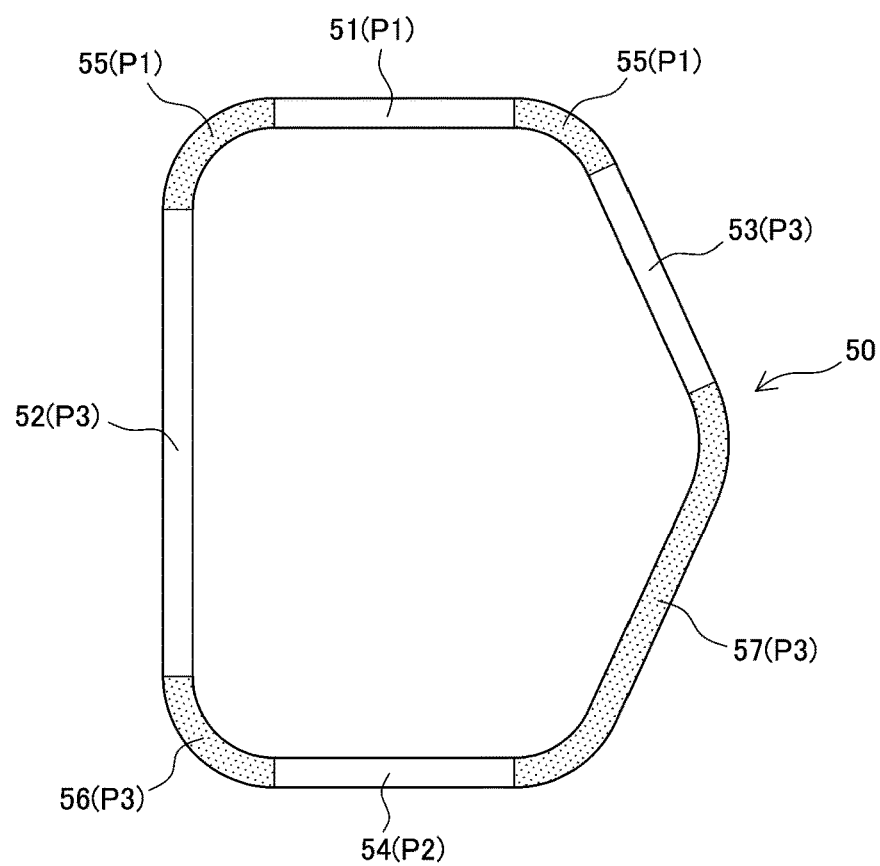

FIGS. 5, 6, 8, and 9 illustrate a second embodiment of the invention, and FIGS. 5 and 7 illustrate a third embodiment of the invention. The weather strips according to the second and third embodiments embody the invention, and basically includes the first portion P1, the second portion P2, and the third portion P3 as in the case of the weather strip 6 according to the first embodiment. The second and third embodiments are different from the first embodiment in a position to which the weather strip is applied and in a method of arranging the first to third portions (P1, P2, and P3). Hereinafter, these different points will be mainly described.

Second Embodiment

FIG. 5 illustrates a front door opening portion 31 and a rear door opening portion 32 of a 4-door wagon type automobile 30 in a state where a front door and a rear door are removed. 30a represents a front pillar portion of a vehicle front portion, 30b represents a middle pillar portion (also referred to as "center pillar portion") of a vehicle middle portion, and 30c represents a rear pillar portion of a vehicle rear portion. A front door and a rear door (not illustrated) are supported by hinges 33 and 34 (indicated by broken lines) to be openable and closable. A weather strip 40 according to the second embodiment is mounted over the entire peripheral length of an opening edge of the front door opening portion 31.

As illustrated in (A) of FIG. 6, an opening edge of the front door opening portion 31 is bordered with a combination of four side portions (31a to 31d) and four corner portions (31e and 31f). The four side portions include: a roof-side side portion 31a that extends substantially horizontally along an upper edge of the front door opening portion 31; a front pillar-side side portion 31b that extends along the front pillar portion 30a in an up-down direction; a middle pillar-side side portion 31c that extends along the middle pillar portion 30b in the up-down direction; and a floor-side side portion 31d that extends substantially horizontally along a lower edge of the front door opening portion 31. The four corner portions include: a pair of front and rear roof-side corner portions 31e that are positioned between the roof-side side portion 31a and the front and middle pillar-side side portions 31b and 31c; and a pair of front and rear floor-side corner portions 31f that are positioned between the floor-side side portion 31d and the front and middle pillar-side side portion 31b and 31c.

(B) of FIG. 6 schematically illustrates the weather strip 40 before being mounted on the front door opening portion 31. As illustrated in FIG. 5 and (B) of FIG. 6, the weather strip 40 is formed in an annular shape (or an endless strip shape) corresponding to the opening edge of the front door opening portion 31, and is configured as an elongated rubber member having a length corresponding to the entire peripheral length of the opening edge of the front door opening portion 31. The weather strip 40 includes: a roof-side side portion corresponding portion 41 corresponding to the roof-side side portion 31a; a front pillar-side side portion corresponding portion 42 corresponding to the front pillar-side side portion 31b; a middle pillar-side side portion corresponding portion 43 corresponding to the middle pillar-side side portion 31c; a floor-side side portion corresponding portion 44 corresponding to the floor-side side portion 31d; two roof-side corner portion corresponding portions 45 corresponding to the two roof-side corner portions 31e; and two floor-side corner portion corresponding portions 46 corresponding to the two floor-side corner portions 31f.

In the weather strip 40 according to the second embodiment, as illustrated in (B) of FIG. 6, the front pillar-side side portion corresponding portion 42, and the roof-side corner portion corresponding portion 45 and the floor-side corner portion corresponding portion 46 adjacent to the upper and lower sides thereof are formed as the first portion P1. In addition, the middle pillar-side side portion corresponding portion 43 is formed as the second portion P2. Further, the roof-side side portion corresponding portion 41 and the roof-side corner portion corresponding portion 45 adjacent to the rear side thereof, and the floor-side side portion corresponding portion 44 and the floor-side corner portion corresponding portion 46 adjacent to the rear side thereof are formed as the third portion P3.

Figure 8:
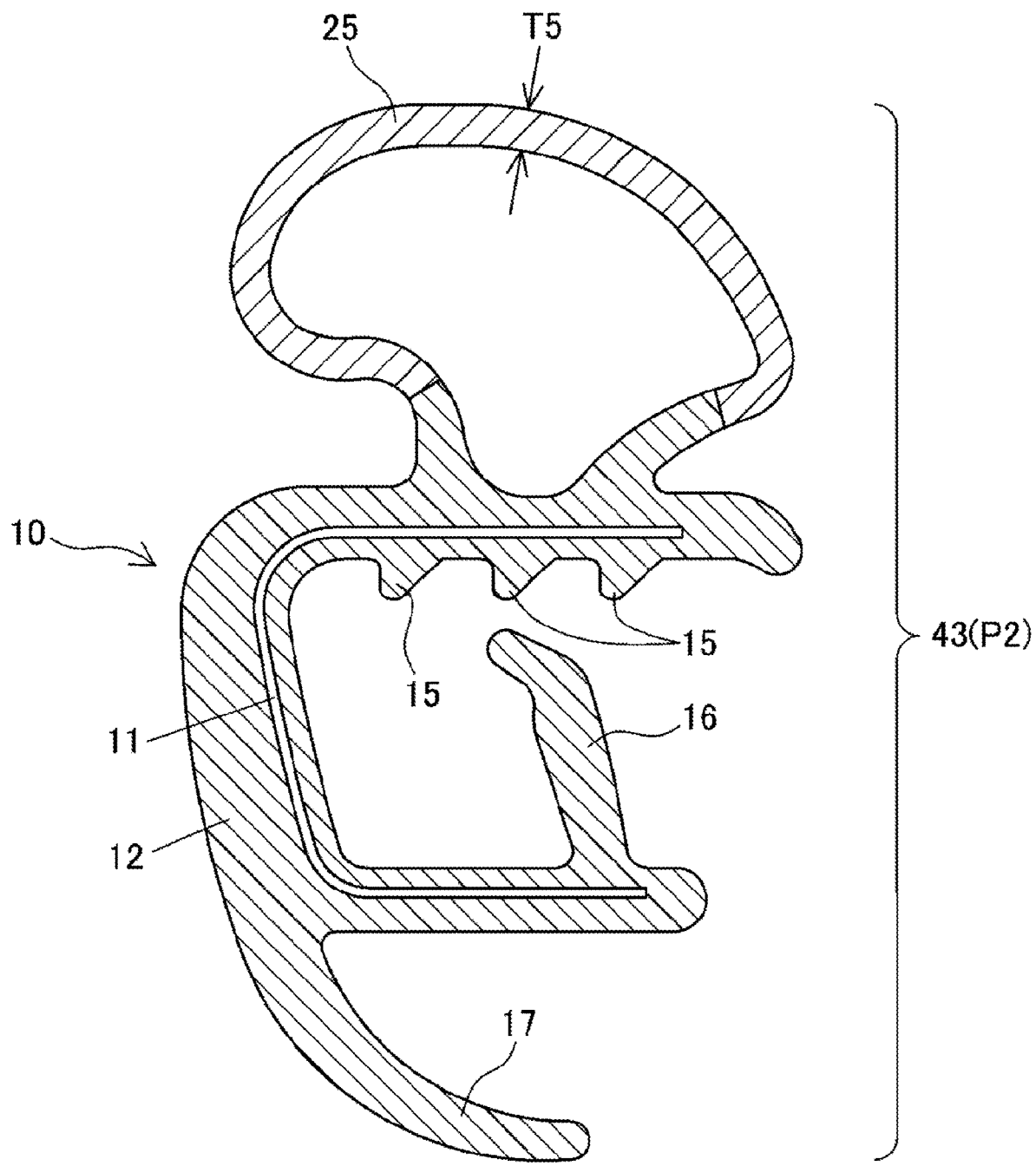
FIG. 8 is a cross-sectional view of the weather strip taken along line VIII-VIII in FIG. 5 and (B) of FIG. 6.
Figure 9:
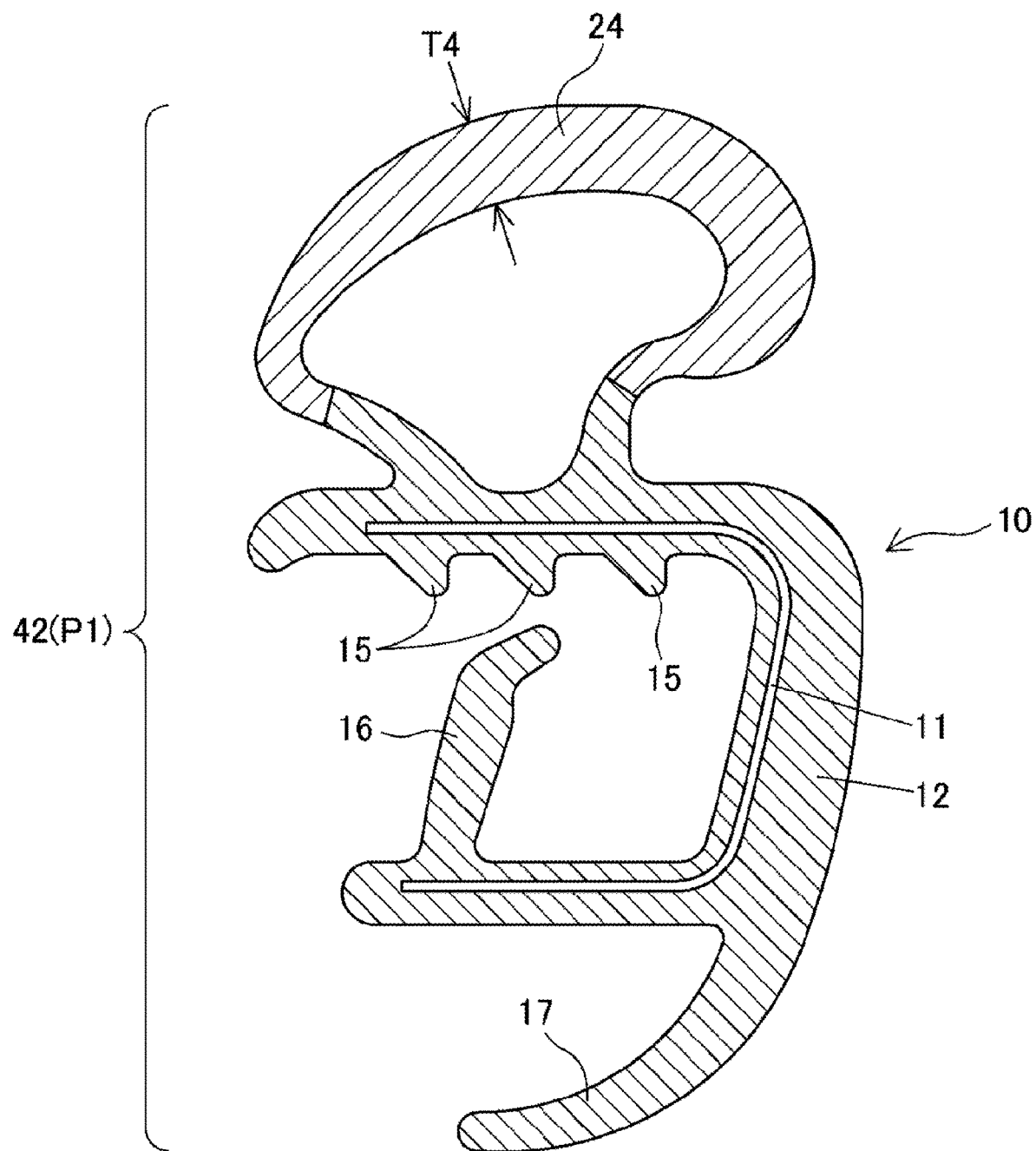
FIG. 9 is a cross-sectional view of the weather strip taken along line IX-IX in FIG. 5 and (B) of FIG. 6.

FIG. 8 illustrates a cross-section taken along line VIII-VIII of FIG. 5 and (B) of FIG. 6. FIG. 8 illustrates not only a cross-section of the middle pillar-side side portion corresponding portion 43 but also a cross-section of the second portion P2 according to the second embodiment. In addition, FIG. 9 illustrates a cross-section taken along line IX-IX of FIG. 5 and (B) of FIG. 6. FIG. 9 illustrates not only a cross-section of the front pillar-side side portion corresponding portion 42 but also a cross-section of the first portion P1 according to the second embodiment. A cross-section of the third portion P3 is not illustrated in the drawing and has a similar shape to the cross-sectional shapes of the first portion P1 (FIG. 9) and the second portion P2 (FIG. 8). As can be seen from FIGS. 8 and 9, each of the portions (P1, P2, and P3) of the weather strip 40 according to the second embodiment includes: an attachment portion 10; and sealing portions 25 and 24 with a hollow tunnel shape that is disposed adjacent to the attachment portion 10.

The shape and dimension of a cross-section of the attachment portion 10 are substantially uniform at any position of the weather strip 40 (that is, at any position of P1, P2, and P3). Specifically, as illustrated in FIGS. 8 and 9, the attachment portion 10 includes: a core metal 11 having an U-shape in cross-section; a rubber cover portion 12 that covers the core metal 11; three holding projections 15 and a holding lip 16 that protrude from an inner surface of the rubber cover portion 12; and a cover lip 17 that protrudes from an outer surface of the rubber cover portion 12. A vehicle side member (flange portion) configuring the opening edge of the front door opening portion 31 is interposed between the holding projections 15 and the holding lip 16 such that the weather strip 40 is fixed to the opening edge of the front door opening portion 31. The cover lip 17 is a lip for covering an end portion of an interior material such as a carpet or a cloth material.

The hollow sealing portion 24 illustrated in FIG. 9 and the hollow sealing portion 25 illustrated in FIG. 8 have substantially the same cross-sectional shape but have different wall portion dimensions. Specifically, a wall thickness T4 of the sealing portion 24 of FIG. 9 is set to be larger than a wall thickness T5 of the sealing portion 25 of FIG. 8 (T5<T4). As a result, the external shape and cross-sectional area of the sealing portion 24 of the first portion P1 are larger than those of the sealing portion 25 of the second portion P2. The sealing portion (not illustrated) of the third portion P3 is formed such that the external shape and cross-sectional area thereof gradually change from the sealing portion 24 of the first portion P1 toward the sealing portion 25 of the second portion P2.

The weather strip 40 according to the second embodiment exhibits substantially the same effects as the weather strip 6 according to the first embodiment.

Particularly in the weather strip 40 according to the second embodiment, the roof-side and floor-side side portion corresponding portions 41 and 44 corresponding to the roof-side and floor-side side portions 31a and 31d, which extend in a direction from a hinge (33)-side base end of the front door toward a hinge opposite-side distal end of the front door during the closing of the front door, are formed as the third portion P3. As described above, the third portion P3 having the gradually changing cross-sectional shape is assembled into the roof-side and floor-side side portions 31a and 31d that extend in the direction from the hinge (33)-side base end of the front door toward the hinge opposite-side distal end of the front door. Thus, the load during the closing of the front door as a hinge-type door body can be made to gradually change over the entire length of a side portion of the front door. As a result, door closing performance can be improved.

Particularly in the embodiment, the third portion P3 (41+45, 44+46) is continuous to the first portion P1 (45+42+46) having the first cross-sectional shape (FIG. 9) at a front end position (an end position close to the hinge-side base end), and is continuous to the second portion P2 (43) having the second cross-sectional shape (FIG. 8) at a rear end position (an end position close to the hinge opposite-side distal end) of the third portion P3 (41+45, 44+46). Therefore, the cross-sectional shape of the third portion P3 (41+45, 44+46) gradually decreases in size in a direction from the front end position (the end position close to the hinge-side base end) toward the rear end position (the end position close to the hinge opposite-side distal end). Thus, air is likely to escape during the closing of the front door, and the front door can be closed with a relatively small force.

Another Example of Second Embodiment

In the weather strip 40 according to the second embodiment, the roof-side corner portion corresponding portion 45 and the floor-side corner portion corresponding portion 46 adjacent to the upper and lower sides of the front pillar-side side portion corresponding portion 42 are formed as the first portion P1. However, the roof-side corner portion corresponding portion 45 and the floor-side corner portion corresponding portion 46 may be formed as the third portion P3.

In addition, in the weather strip 40 according to the second embodiment, the roof-side corner portion corresponding portion 45 adjacent to the rear side of the roof-side side portion corresponding portion 41, and the floor-side corner portion corresponding portion 46 adjacent to the rear side of the floor-side side portion corresponding portion 44 (that is, the corner portion corresponding portions 45 and 46 adjacent to the upper and lower sides of the middle pillar-side side portion corresponding portion 43) are formed as the third portion P3. However, the corner portion corresponding portions 45 and 46 may be formed as the second portion P2.

Third Embodiment

Different points of the third embodiment of the invention from the first and second embodiments will be described.

As illustrated in FIG. 5, a weather strip 50 according to the third embodiment is mounted over the entire peripheral length of an opening edge of the rear door opening portion 32.

As illustrated in (A) of FIG. 7, an opening edge of the rear door opening portion 32 is bordered with a combination of substantially four side portions (32a to 32d) and substantially four corner portions (32e to 32g). The four side portions include: a roof-side side portion 32a that extends substantially horizontally along an upper edge of the rear door opening portion 32; a middle pillar-side side portion 32b that extends along the middle pillar portion 30b in the up-down direction; a rear pillar-side side portion 32c that extends along the rear pillar portion 30c in the up-down direction; and a floor-side side portion 32d that extends substantially horizontally along a lower edge of the rear door opening portion 32. The four corner portions include: a pair of front and rear roof-side corner portions 32e that are positioned between the roof-side side portion 32a and the middle and rear pillar-side side portions 32b and 32c; a floor-side front corner portion 32f that is positioned between the middle pillar-side side portion 32b and the floor-side side portion 32d; and a floor-side rear corner portion 32g that is positioned between the rear pillar-side side portion 32c and the floor-side side portion 32d. The floor-side rear corner portion 32g is a relatively long curved portion that is positioned above a wheel house of a rear wheel and is curved substantially along the contour of the wheel house, in which an upper end position of the corner portion reaches the vicinity of a so-called belt line L (a boundary line between a window and a door panel in the door body).

(B) of FIG. 7 schematically illustrates the weather strip 50 before being mounted on the rear door opening portion 32. As illustrated in FIG. 5 and (B) of FIG. 7, the weather strip 50 is formed in an annular shape (or an endless strip shape) corresponding to the opening edge of the rear door opening portion 32, and is configured as an elongated rubber member having a length corresponding to the entire peripheral length of the opening edge of the rear door opening portion 32. The weather strip 50 includes: a roof-side side portion corresponding portion 51 corresponding to the roof-side side portion 32a; a middle pillar-side side portion corresponding portion 52 corresponding to the middle pillar-side side portion 32b; a rear pillar-side side portion corresponding portion 53 corresponding to the rear pillar-side side portion 32c; a floor-side side portion corresponding portion 54 corresponding to the floor-side side portion 32d; two roof-side corner portion corresponding portions 55 corresponding to the two roof-side corner portions 32e; a floor-side front corner portion corresponding portion 56 corresponding to the floor-side front corner portion 32f; and a floor-side rear corner portion corresponding portion 57 corresponding to the floor-side rear corner portion 32g.

In the weather strip 50 according to the third embodiment, as illustrated in (B) of FIG. 7, the roof-side side portion corresponding portion 51 and the two roof-side corner portion corresponding portions 55 adjacent to the front and rear sides thereof are formed as the first portion P1. In addition, the floor-side side portion corresponding portion 54 is formed as the second portion P2. Further, the middle pillar-side side portion corresponding portion 52 and the floor-side front corner portion corresponding portion 56 adjacent to the lower side thereof, and the rear pillar-side side portion corresponding portion 53 and the floor-side rear corner portion corresponding portion 57 adjacent to the lower side thereof are formed as the third portion P3.

The cross-sectional shape of the first portion and the cross-sectional shape of the second portion in the weather strip 50 according to the third embodiment are the same as the cross-sectional shape (FIG. 9) of the first portion P1 and the cross-sectional shape (FIG. 8) of the second portion P2 in the weather strip 40 according to the second embodiment, respectively. The same shall be applied to the third portion P3 according to the third embodiment.

The weather strip 50 according to the third embodiment exhibits substantially the same effects as the weather strip 6 according to the first embodiment and the weather strip 40 according to the second embodiment.

Another Example of Third Embodiment

In the weather strip 50 according to the third embodiment, the two roof-side corner portion corresponding portions 55 adjacent to the front and rear sides of the roof-side side portion corresponding portion 51 are formed as the first portion P1. However, the two roof-side corner portion corresponding portions 55 may be formed as the third portion P3.

In addition, in the weather strip 50 according to the third embodiment, the floor-side front corner portion corresponding portion 56 and the floor-side rear corner portion corresponding portion 57 (that is the corner portion corresponding portions 56 and 57 adjacent to the front and rear sides of the floor-side side portion corresponding portion 54) are formed as the third portion P3. However, the floor-side front corner portion corresponding portion 56 and the floor-side rear corner portion corresponding portion 57 may be formed as the second portion P2.

REFERENCE NUMERALS LIST

P1: First portion
P2: Second portion
P3: Third portion
1: Automobile
2: Back door (door body)
3: Back door opening portion (vehicle body opening portion)
4a, 4b, 4c: Side portion
5a, 5c: Corner portion
6: Weather strip (sealing member)
10: Attachment portion
20: Sealing portion with hollow tunnel shape
24: Sealing portion with hollow tunnel shape
25: Sealing portion with hollow tunnel shape
30: Automobile
31: Front door opening portion (vehicle body opening portion)
31a, 31b, 31c, 31d: Side portion
31e, 31f: Corner portion
32: Rear door opening portion (vehicle body opening portion)
32a, 32b, 32c, 32d: Side portion
32e, 32f, 32g: Corner portion
40: Weather strip (sealing member)
50: Weather strip (sealing member)

The invention claimed is:

1. A sealing member that is configured to be attached to a vehicle body opening portion of a vehicle and is configured to seal a gap between the vehicle body opening portion and a door body capable of closing the vehicle body opening portion, the sealing member being elongated and comprising:
an attachment portion and a sealing portion integrated with the attachment portion in a cross-section of the sealing member, the attachment portion being configured to be attached to a flange portion provided to an opening edge of the vehicle body opening portion, and
a first portion, a second portion, and a third portion disposed along a longitudinal direction of the sealing member, the third portion being provided between the first portion and the second portion to continuously and integrally connect the first portion and the second portion to each other,
wherein:
the at least one of a wall thickness and a height of the sealing portion of the second portion is smaller than at least one of a wall thickness and a height of the sealing portion of the first portion, respectively,
the third portion is formed such that at least one of a wall thickness and a height of the sealing portion thereof changes along the longitudinal direction, and
a length of the third portion extending along the longitudinal direction of the sealing member is longer than a length of the first portion and is longer than a length of the second portion.

2. The sealing member according to claim 1,
wherein the elongated sealing member includes the third portion at at least two positions.

3. The sealing member according to claim 1, wherein:
the opening edge of the vehicle body opening portion is bordered with a plurality of side portions and a plurality of corner portions which are continuous to the side portions, and
the length of the first portion is identical to a length of at least one corner portion of the opening edge of the vehicle body opening portion.

4. The sealing member according to claim 1, wherein:
the opening edge of the vehicle body opening portion is bordered with a plurality of side portions and a plurality of corner portions which are continuous to the side portions, and
the length of the second portion is identical to a length of at least one side portion of the opening edge of the vehicle body opening portion.

5. The sealing member according to claim 1, wherein:
the opening edge of the vehicle body opening portion is bordered with a plurality of side portions and a plurality of corner portions which are continuous to the side portions, and
the length of the third portion is identical to or larger than a length of at least one side portion of the opening edge of the vehicle body opening portion.

6. The sealing member according to claim 5,
wherein the third portion corresponds to a side portion that extends in a direction from a hinge-side base end of the door body in a closed state toward a hinge opposite-side distal end of the door body in the closed state among the plurality of side portions configuring the opening edge of the vehicle body opening portion.

7. The sealing member according to claim 6,
wherein the third portion has at least one of the wall thickness and the height of the sealing portion of the first portion at an end position close to the hinge-side base end of the door body, and has at least one of the wall thickness and the height of the sealing portion of the second portion at an end position close to the hinge opposite-side distal end of the door body.

8. The sealing member according to claim 1,
wherein the height of the sealing portion of at least a part of the second portion is lower than the height of the sealing portion of the first portion.

9. The sealing member according to claim 1,
wherein the wall thickness of the sealing portion of at least a part of the second portion is smaller than the wall thickness of the sealing portion of the first portion.

10. The sealing member according to claim 1,
wherein a cross-sectional shape of the attachment portion of the first portion, a cross-sectional shape of the attachment portion of the second portion, and a cross-sectional shape of the attachment portion of the third portion are substantially identical.

* * * * *